United States Patent [19]

Yamaguchi

[11] Patent Number: 5,228,027
[45] Date of Patent: Jul. 13, 1993

[54] DATA COMMUNICATION APPARATUS

[76] Inventor: Noboru Yamaguchi, 203 Isogo-Mansion, 11-15, Isogodai, Isogo-ku, Yokohama-shi, Kanagawa-ken, Japan

[21] Appl. No.: 749,844

[22] Filed: Aug. 26, 1991

[30] Foreign Application Priority Data

Aug. 24, 1990 [JP] Japan .................................. 2-223936

[51] Int. Cl.$^5$ ........................ H04J 3/02; H01H 67/00
[52] U.S. Cl. ........................... 370/85.15; 340/825.05; 340/825.18; 370/55; 370/85.30
[58] Field of Search ..................... 340/825.05, 825.18, 340/825.59; 370/85.2, 85.17, 85.15, 55, 85.1, 85.3, 13.1, 97; 178/70 R; 455/7, 9; 371/20.1, 20.2; 375/3, 4

[56] References Cited

U.S. PATENT DOCUMENTS

| 4,727,539 | 2/1988 | Arita et al. | 370/85.15 |
| 4,751,697 | 6/1988 | Hunter et al. | 370/85.15 |
| 4,780,870 | 10/1988 | McHarg et al. | 370/85.15 |
| 4,930,122 | 5/1990 | Takahashi et al. | 370/85.15 |

OTHER PUBLICATIONS

Yamaguchi, U.S. Patent Application Ser. No. 716,876, Jun. 18, 1991.

Primary Examiner—Douglas W. Olms
Assistant Examiner—Ajit Patel
Attorney, Agent, or Firm—Shea & Gould

[57] ABSTRACT

Data communication units and a data communication apparatus comprising a plurality of the units which can prevent transmission collision and can transfer the transmission initiative without a token as typically required in a token-ring network. The unit has a relay unit generating a relay signal by a received signal, a transmitter generating a transmission signal comprised of its own original data, and a sending controller which selects a send signal among the relay signal and the transmission signal and generates a non-signal state by monitoring the send signal or the received signal sent through a transmission route. The sending controller is capable of transferring the transmission initiative, and includes a first timer which generates a trigger output for selecting the transmission signal after a non-signal state continued a first prescribed time TM, a second timer which starts and maintains a non-signal state for a second prescribed time TF (TF>TM) after the owner unit having the transmission initiative finishes sending, and a sending control circuit which controls a data selector to switch the send signal by the trigger output, a request-to-send signal RTS usually given by a transmission source computer, and a transmission enable signal TES produced by the received signal, and to generate a non-signal state throughout the time TF by the signal RTS reversing the polarity. Transmission collisions can be prevented by utilizing the signal TES or providing proper values for the time constant TM and TF. The transfer of the transmission initiative is performed by controlling the sending controller and the signal RTS.

8 Claims, 11 Drawing Sheets

DATA COMMUNICATION APPARATUS

FIELD OF THE INVENTION

The present invention relates to data communication units and a data communication apparatus comprising a plurality of these units. They can be effectively used in a communication loop-network where digital serial signals are transmitted through a transmission route. The present invention is preferably applied to communications systems for remote controlled robots, production lines, home appliances, display devices, simple LANs (Local Area Networks), and controllers including many remote input/output units, and provides simple and reliable communication means for terminal units controlled by computers.

DESCRIPTION OF THE PRIOR ART

A conventional arrangement is one in which a plurality of data communication units each function as a master station transmitting a digital serial signal through a transmission route in a communication loop-network. A particular station receives the signal transmitted by itself through the transmission route and also functions as a substation decoding a signal transmitted from another station and received by it through the loop-formed transmission route to thereby perform operations in accordance with the received signal. This system is called a "token ring network". Token ring is established as an international standard (refer, for example, to IEEE 802.5), concerning the transfer of the transmission initiative (or transmission right) between a plurality of data communication units.

The token ring system is one where a token signal (transmission initiative) is circulated around the loop-network. The token signal indicates, through a "mark", whether the transmission route is busy or free. A data communication unit can send data only when it obtains a free-marked token (free token). A busy token is circulating during the sending of data, and a free token is circulating again after the end of sending. By using a token, transmission collisions can possibly be prevented. However, in the token using system, it is necessary for each frame (a signal block unit) to have a token which is usually 3 bytes length; this system therefor has several disadvantages. In cases where small amounts of data (about 1-100 bytes), transmission speed is lower than it would be without a token. It is necessary for a token system to have complex hardware and software. Further, it sometimes occurs that a token is lost, or a never ending frame is produced, and in such cases effective methods of troubleshooting are not available.

SUMMARY OF THE INVENTION

It is an object of the present invention to provide data communication units and a data communication apparatus comprising a plurality of the units which can prevent transmission collisions and can transfer the transmission initiative without a token as used in a token-ring network, thereby eliminating some of the problems which are inherent in conventional systems.

In order to achieve the above mentioned object, the data communication unit according to the present invention sends a digital signal through a transmission route in a data communication network and has a relay unit generating a relay signal by a received signal, a transmitter generating a transmission signal, and a sending controller comprising a first timer, a second timer, and a sending control circuit.

The first timer generates a trigger output TO after a "non-signal state" is continued for a first prescribed time TM.

The second timer starts a non-signal state and maintains the non-signal state for a second prescribed time TF after the end of sending the transmission signal.

The term "non-signal state" refers to the still state of an objective signal in which the polarity of the signal is fixed either high (logical "1") or low (logical "0") and no polarity reversal of the signal occurs.

In relation to the above described definition of the term "non-signal state", the term "non-signal generator" means a device which maintains the polarity of an objective signal in a fixed state "either high or low" throughout a prescribed time TM to generate the non-signal state of the signal.

Moveover, the term "non-signal detection timer" means an event timer which monitors an objective signal and generates a time-up signal as the "non-signal detection signal" only when any polarity reversal of the object signal does not occur throughout a prescribe monitoring time TM.

The objective signal is the output signal (the send signal) or the input signal (the received signal) of a data communication unit in the present invention.

The sending control circuit includes a selector means, and a non-signal generator means as discussed above.

The selector means selects the send signal among the received signal and the transmission signal by using the trigger output TO and watching whether a request-to-send signal RTS is active or inactive.

In accordance with the preceding explanation, the non-signal generator means maintains the polarity of the send signal as a fixed value for the second prescribed time TF when the signal RTS becomes inactive during the sending of the transmission signal.

In the above data communication unit, the relay unit may be adapted to record information as to the polarity of the request-to-send signal in the received signal.

The above data communication unit may further comprise a transmission enable signal generator for generating a transmission enable signal when address information included in the received signal is coincident with the address of the data communication unit itself, and the sending controller may be adapted to switch the send signal from the relay signal to the transmission signal only when the transmission enable signal is output from the transmission enable signal generator. In this case, it is preferred that the relay unit is adapted to record information as to the polarity of the request-to-send signal and information of its own address in the received signal.

As a means to distinguish between a signal-sending state and a non-signal state, the send signal has a signal format wherein the polarity reversal of the send signal occurs within a prescribed polarity-reversal time period TP, and it is adapted such that the signal-sending state and the non-signal state is distinguished by whether or not reversal of polarity occurs within the prescribed period TP.

A data communication apparatus according to the present invention comprises a plurality of data communication units located in a communication loop-network. In a communication loop-network where the data communication apparatus comprises n sets (n is an integer larger than 1) of the data communication units, any of the data communication units is preferred to have a second prescribed time $TF_i$ which satisfies the following condition:

$$TL < TF_i < TL + TM_{min} \text{ for all values of } i$$

where $i = 1, 2, \ldots, n$

TL is the circulated time it takes a signal to make a round of the communication loop-network;

$TM_{min}$ is the minimum value of the first prescribed time of all of the (n) data communication units.

Furthermore, in cases where in the communication loop-network the data communication apparatus comprises n sets (n is an integer larger than 1) of the data communication units, any of the data communication units is preferred to have the first prescribed time defined by $TM_i$ or $TM_j$ which satisfies the relations:

$$|TM_i - TM_j| > TL \text{ for all values of } i, j$$

and $$TM_i > TP \text{ for all values of } i$$

where $i \neq j, i = 1, 2, \ldots, n, j = 1, 2, \ldots, n$

TL is the circulated time it takes a signal to make a round of the communication loop network.

TP is the prescribed maximum time period for polarity reversal of the send signal.

The data communication unit according to the present invention, by means of the first and second timers and the sending control circuit, can maintain the send signal in the non-signal state during the second prescribed time after the end of the sending the transmission signal and, thereafter, send the relay signal. Therefore, the fact that the communication network is in a free state can be determined by detecting the non-signal state. Thus, the transmission initiative (or transmission right) can be easily transferred in the data communication apparatus from one data communication unit to another unit.

By adapting the relay unit to record information about the polarity of a request-to-send signal RTS on the received signal, the data communication unit currently holding the transmission initiative (represented by "the owner unit") in the data communication apparatus can determine that another data communication unit is requesting to send data and, thus, the owner unit can use the information for reference in determining whether or not it should abandon the transmission initiative.

By providing the above described data communication unit with the transmission enable signal generator and configuring the system such that a data communication unit can acquire the transmission initiative only when the transmission enable signal is active, the owner unit can easily determined which data communication unit should be the next transferee of the transmission initiative. In this case, if the data communication unit wishing to acquire the transmission initiative generates the relay signal by recording the information as to the polarity of a request-to-send signal and the information concerning its address in the received signal, the owner unit can find which data communication unit is requesting to send its data.

Further, in order to distinguish between the signal-sending state and the non-signal state, a signal format is utilized in which the polarity invariably reverses in the signal-sending state, within a prescribed polarity reversal period TP. It then becomes possible to distinguish between the signal-sending state and the non-signal state by detecting whether or not the polarity reverses within the prescribed time TP, and thus the distinction can be made easily and reliably.

In a data communication apparatus comprised of a plurality (n sets) of the data communication units forming a loop-network, a signal circulates through the transmission route. By adjusting each of the data communication units so as to satisfy the condition $$TL < TF_i < TL + T_{min} \text{ for } i = 1, 2, \ldots, n,$$

transmission collision is prevented because any non-signal state always ends within a proper time limit.

Further, in the above described data communication apparatus, all of the n data communication units are configured so as to satisfy the relations:

$$|TM_i - TM_j| > TL \text{ for all values of } i, j$$

and $$TM_i > TP \text{ for all values of } i.$$

where $i \neq j, i = 1, 2, \ldots, n, j = 1, 2, \ldots, n.$

These relations are equivalent to the following relation:

$$TP < TM_i < TM_2 - TL < \cdots < TM_n - (n-1)TL$$

if $TM_i < TM_2 < \cdots < TM_n$

It is evident that different priority decided by $TM_i$ is given to each of the units and that the higher priority is given to the unit with shorter period of time $TM_i$. Since the units can thus acquire the transmission initiative according to the priority decided by $TM_i$ when the request-to-send signal is active, simultaneous transmission from two or more data communication units can be positively prevented, thereby preventing transmission collisions.

Since, as described above, the data communication apparatus according to the present invention can produce a non-signal state to be maintained during a prescribed time, the transfer of the transmission initiative between a plurality of data communication units can be performed reliability and easily.

DESCRIPTION OF THE PREFERRED EMBODIMENTS

An embodiment of the present invention will be described below with reference to the accompanying drawings.

Figure 10:
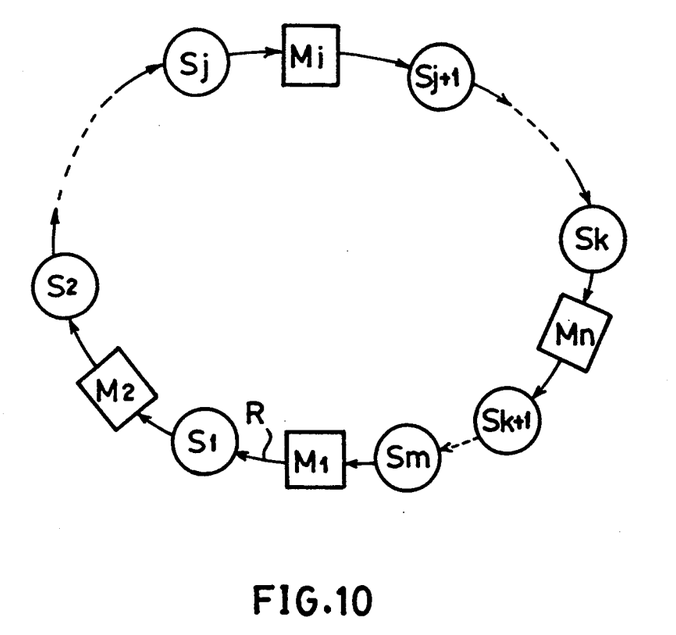
FIG. 10 is a schematic diagram showing an example of the data communication apparatus according to the present invention.

FIG. 10 is a schematic diagram showing an example of a data communication apparatus according to the present invention.

$M_1, M_2, \ldots, M_i, \ldots, M_n$ denote master stations as examples of data communication units according to the present invention, and $S_1, S_2, \ldots, S_m$ denote substations comprising a relay unit without a transmitter for the data communication units of the present invention. R is a transmission route usually comprised of a pair of twisted wires, a coaxial cable, an optical fiber or the like.

Figure 11:
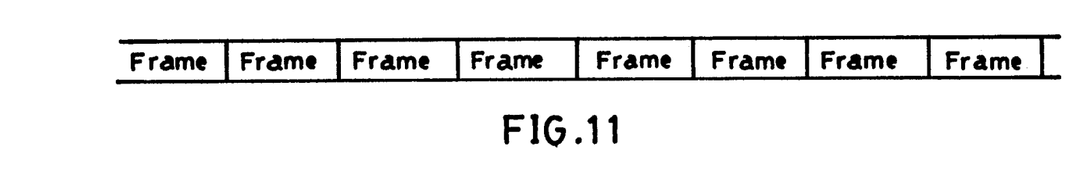
FIG. 11 is a diagram schematically showing an example of a train of frames as signal block units used in the present invention.

FIG. 11 is a diagram schematically showing the state of a train of frames as signal block units used in the present embodiment.

Here, we assume that continuous frames as shown in FIG. 11 are constantly transmitted through the transmission route R. A frame is generated and transmitted by the master station $M_i$ having the transmission initiative, and the transmission of the frame is completed when it is returned to the master station $M_i$.

Figure 12:
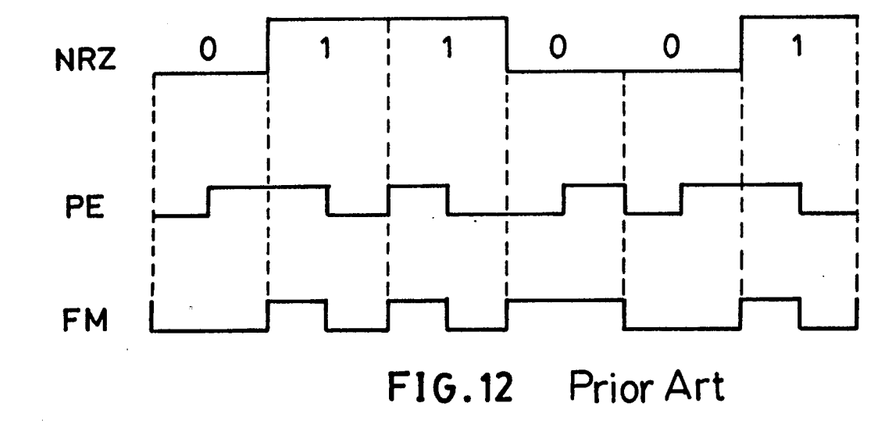
FIG. 12 is a diagram showing examples of signal formats used in the present invention.

FIG. 12 is a diagram showing typical signal formats used in the present embodiment. The NRZ (Non Return to Zero) is a signal format shown only for comparison and can not be used in the embodiment. The NRZ format is such that its L level corresponds to a signal "0" and its H level corresponds to a signal "1", simply. In this NRZ format, if an effective signal includes multiple "0" signals appearing in succession, the signal will remain at the L level and, then, it would be recognized in the present embodiment to be a non-signal state.

Therefore, the PE (Phase Encoding) signal or the FM (Frequency Modulation) signal is used in the present embodiment. The PE signal is used in the present embodiment. The PE signal is such that its polarity reverses at the middle of a one-bit signal as shown in FIG. 12. By using the PE signal, a reversal of polarity always takes place within one-bit signal and no direct current component is included in it. Accordingly, the PE signal is a preferable data format to be used in data communications. The FM signal has a data format such that its polarity reverses only one time in a signal "0", while the polarity reverses two times in a signal "1". Also in this case, even if "0" signals appear in succession, the polarity invariably reverses every bit. Although the PE signal and the FM signal have been discussed above by way of example, the applicable data formats are not limited to them. Any data format in which the polarity reverses within a predetermined interval such as the MFM (Modified FM) signal will naturally be applicable.

Figure 1:
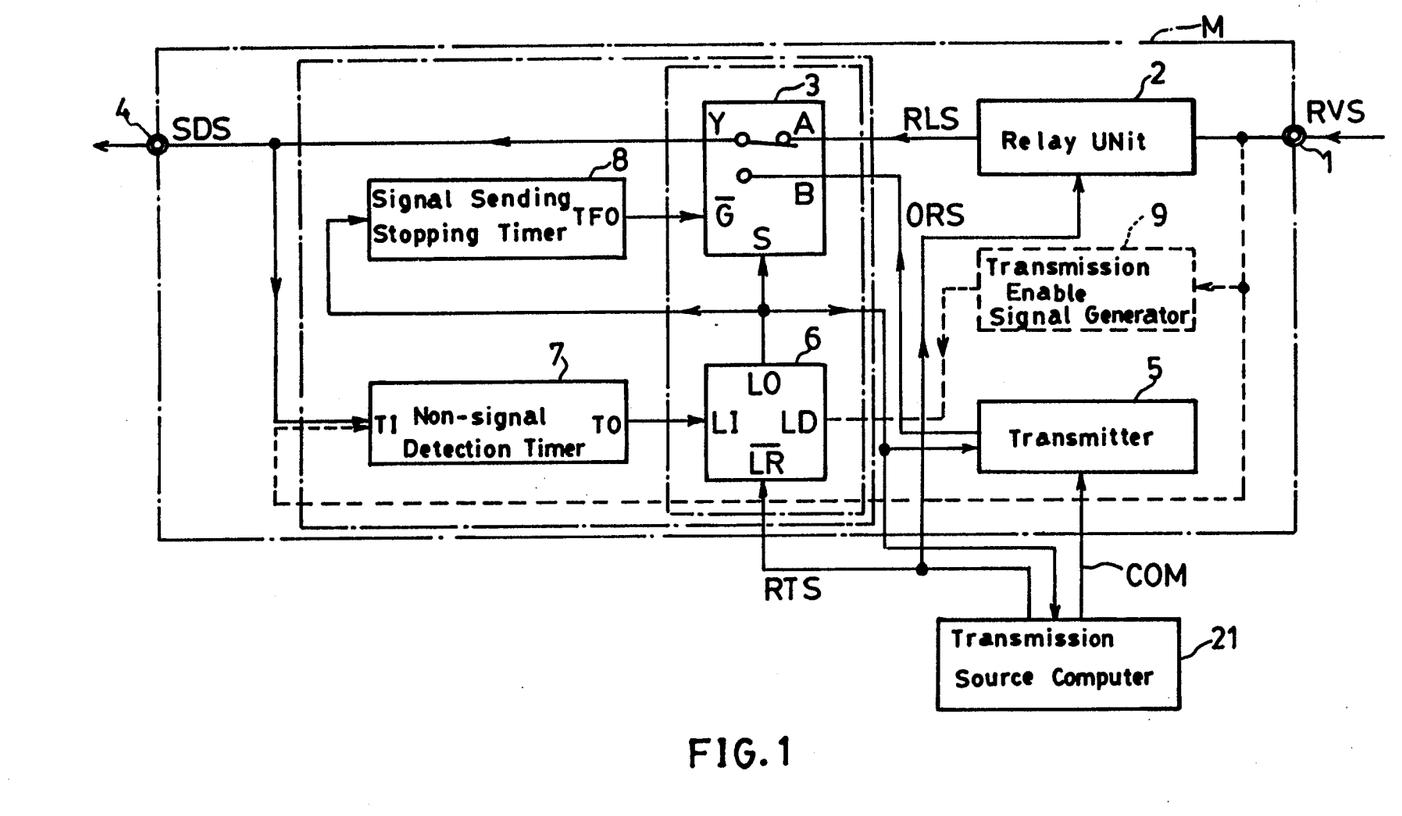
FIG. 1 is a circuit block diagram showing a master station as an example of the data communication unit of the present invention.

FIG. 1 is a circuit block diagram showing a master station as an example of the data communication unit according to the present invention. For clarification, the following reference words and reference characters are used throughout the description:

"owner" means the master station (communication unit) having a transmission initiative (or transmission right)

"original-sending" means that the present owner sends its transmission signal

"relaying" means that communication units except the present owner send a relay signal;

"sending" means original-sending or relaying;

"logical state" means On-state (active, turned on) or off-state (inactive, turned off) of a signal;

ORS is an original-sending signal;

SDS is a send signal;

RLS is a relay signal;

RVS is a received signal;

RTS is a request-to-send signal given by the transmission source computer;

COM is an original information given by the transmission source computer.

Further, positive logic (H-level is active) is adopted here for convenience of explanation.

A signal transmitted through the transmission route is input to master station M from an input terminal 1 as a received signal RVS of master station M. The received signal RVS is supplied to a relay unit 2. Relaying unit 2 decodes and drives the received signal RVS and, according to the need, accesses I/O devices (not shown) connected with the master station M. (I/O devices; printer, display, personal computer, etc.). When the data selector 3 is set to output the relay signal RLS, the relay signal RLS is sent from an output terminal 4 to the downstream side of the transmission route as a send signal SDS of the master station M.

A transmission source computer 21 incorporated in the master station M or positioned separately from the master station M (the transmitting source computer 21 is illustrated as a separate unit from the master station M in FIG. 1) is the supplier of transmission information and the controller of a request-to-send signal. The transmission information output from the transmission source computer 21 is delivered as a signal COM in a parallel or serial signal form to a transmitter 5 after the acquisition of the transmission initiative. The transmitter 5 usually stores the transmission information temporarily in a memory buffer register in the transmitter and then converts it into a digital serial signal ORS having a predetermined frame format. When the transmission source computer 21 wishes to acquire the transmission right to send the transmission information, it first outputs the request-to-send signal to the $\overline{LR}$ terminal of a latch circuit 6. In this state, the computer 21 remains on standby until the present owner abandons the transmission initiative. In the described embodiment, the combination of the data selector 3 and the latch circuit 6 is considered to be an example of a sending control circuit in the present invention.

The data selector is operated as follows:

$Y = L$ fixed (or $H$ fixed) if $G = H$;

$Y = A$ if $\overline{G} = L$, and $S = L$;

$Y = B$ if $\overline{G} = L$, and $S = H$;

where H or L is a logical level.

Therefore, the data selector 3 comprises a selector means (Y, A, B, S) and a non-signal generator means. The latch 6 and the timer 8 form the controller of the data selector 3.

The master station acquires the transmission initiative in the following way:

The send signal SDS (which is the same as the relay signal RLS) is input to the input terminal TI of a non-signal detection timer 7. If the polarity of the send signal SDS does not reverse within a prescribed time TM (referred to as a first prescribed time in the present invention), a non-signal detection signal TO is output from its output terminal TO to the input terminal LI of the latch circuit 6. It should be noted that, for simplicity, the same reference character is sometimes used for denoting a terminal in the circuit and the signal output from the terminal. When the non-signal detection signal TO is input to the input terminal LI of the latch circuit 6, if the request-to-send signal RTS is already active, a switch signal LO is output from the output terminal LO of the latch circuit 6 to be input to the select terminal S of the data selector 3. The data selector 3, upon receipt of the switch signal LO, switches so that the transmission signal ORS generated by the transmitter 6 may be output, instead of the relay signal RLS which has been output. Further, the switch signal LO is input as the enable signal to the transmitter 5 and the transmission source computer 21, and thereby, the transmitter 5 and the transmission source computer 21 are informed of the timing for sending the transmission signal ORS, and thereupon, the transmission signal ORS is immediately sent from the master station M as the send signal SDS.

In order to finish sending the transmission signal ORS from the master station M, the transmission source computer 21 turns off the request-to-send signal RTS to be inactive, whereby the latch circuit 6 is reset and the switch signal LO is turned off. At this time, the data selector 3 attempts to switch its output signal from the transmission signal ORS to the relay signal RLS, but the information of the turning off of the switch signal LO is also input to a signal sending stopping timer 8 (which corresponds to what is referred to as a second timer in the present invention) and, throughout a prescribed time TF (what is referred to as a second prescribed time in the present invention), the timer 8 outputs an H level single TFO to the G terminal of the data selector 3, and the level of the output Y is fixed to stop sending. Then the relay signal RLS is output from the data selector 3 after the prescribed time TF has elapsed. By the generation of the non-signal state in which the reversal of the polarity of the output signal is forbidden throughout the prescribed time TF, the information that the master station M abandoned the transmission initiative can be transmitted to other master stations. When another master station has a request to send its data, it can acquire the transmission initiative in the same manner as described above. If it is arranged such that the relay unit 2 generates a relay signal RLS in which the information whether or not a request-to-send signal RTS is active, the master station currently having the transmission initiative can be informed of the fact that another master station has a request to send its data and can use the information as reference for its abandoning the transmission right.

In the described embodiment, the combination of the data selector 3, latch circuit 6, non-signal detection timer 7, and signal sending stopping timer 8 is considered to be an example of what is referred to as a sending controller in the present invention.

Although, in the above described example, the send signal SDS is input to the non-signal detection timer 7 to detect the polarity of the send signal SDS, the received signal RVS, instead of the send signal SDS, may be input to the non-signal detection timer 7 as indicated by a broken line in FIG. 1 to detect the polarity of the received signal RVS.

Whether the send signal SDS is monitored or the received signal RVS is monitored in the non-signal detection timer 7, a transmission enable signal generator 9, indicated by a broken line in FIG. 1, may be provided. The transmission enable signal generator 9 decodes the received signal RVS to determine whether the address of the master station M is recorded as the transferee of the transmission initiative in the received signal RVS, and, if the address of this master station M is recorded, outputs a transmission enable signal to the LD terminal of the latch circuit 6. In this case, even if the request-to-send signal RTS and the non-signal detection signal TO are already active, the switch signal LO is not allowed to be output from the latch circuit 6 unless the transmission enable signal is active. Therefore, when a master station M currently having the transmission right abandons the transmission initiative, the address of the next transferee of the transmission initiative can be recorded in the transmission signal sent from this master station. Then, if it is adapted such that the relay unit 2 generates the relay signal RLS recording therein not only the information concerning its access to an IO device, but also the fact that there is a request from the master station M to send its data and the address of the master station M. Thereby, the master station currently having the transmission initiative can find whether other stations request to send and can use the information as reference in determining the next transferee of the transmission initiative.

Figure 2:
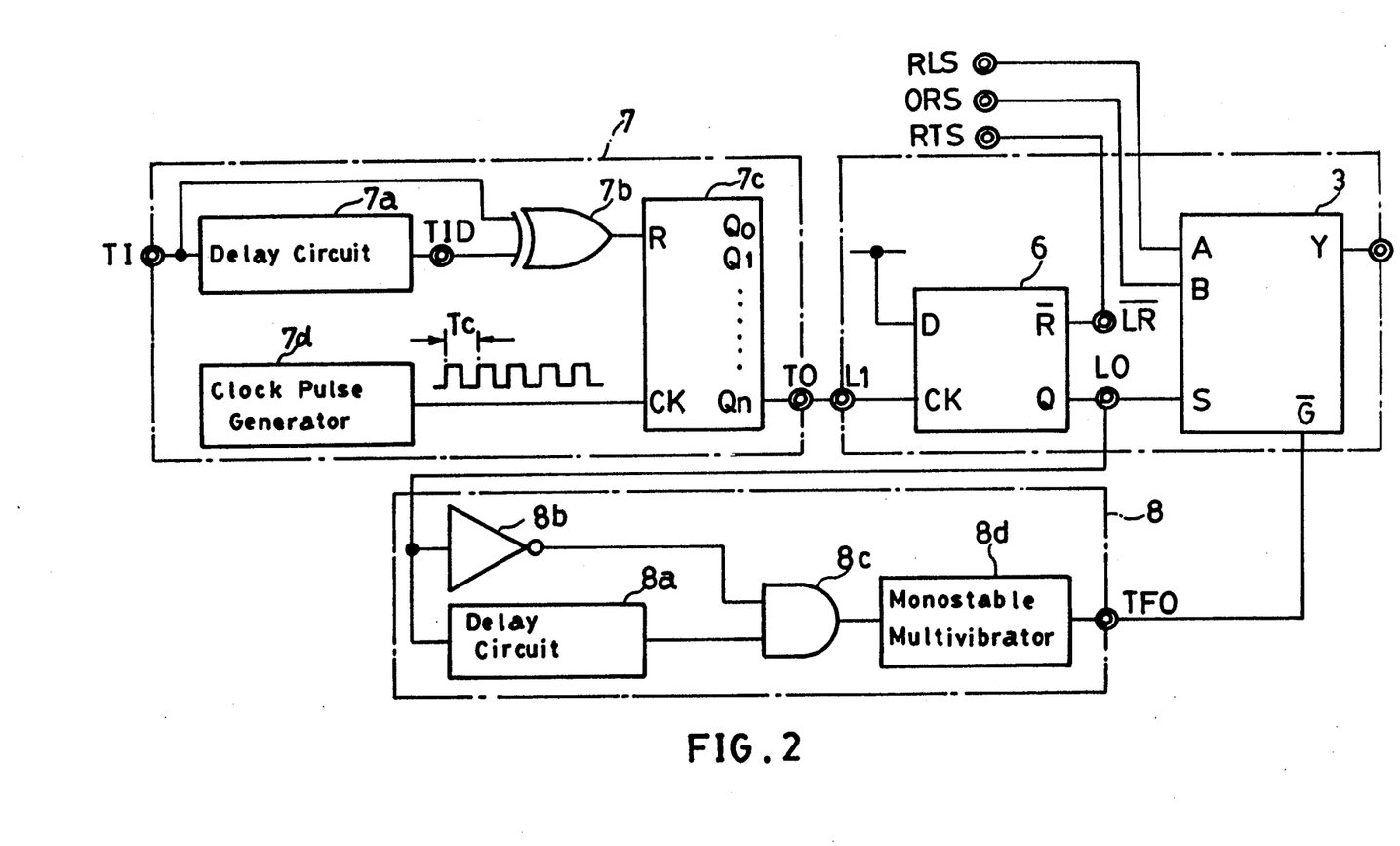
FIG. 2 is a circuit diagram showing an example of the structure of a sending controller shown in FIG. 1.

FIG. 2 is a circuit diagram showing an example of the arrangement of the sending controller shown in FIG. 1 (the combination of the data selector 3, latch circuit 6, non-signal detection timer 7, and signal sending stopping timer 8).

When the send signal SDS (or the received signal RVS) is input to the non-signal detection timer 7 through the input terminal TI, the input signal TI is branched into two paths, i.e., one is passed through a delay circuit 7a to enter an exclusive OR circuit (XOR) 7b and the other is directly input to the XOR 7b and the output of the XOR 7b is used as the reset signal for a counter 7c. The non-signal detection timer 7 includes a clock pulse generator 7d generating a clock pulse with a period of Tc which is input to the clock terminal CK of the counter 7c. The output terminal Qn of the counter 7c is connected with the output terminal TO of the non-signal detection timer 7.

Figure 3:
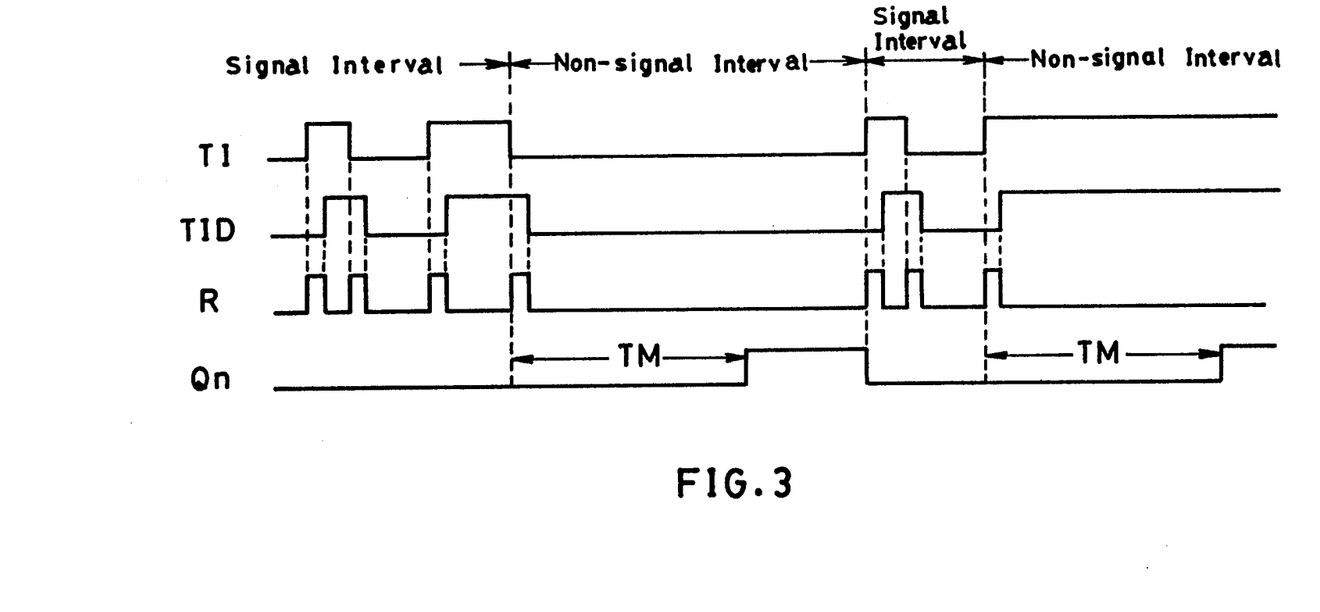
FIG. 3 is a timing chart showing the operation of a non-signal detection timer shown in FIG. 2.

FIG. 3 is a timing chart showing the operation of the non-signal detection timer 7 of FIG. 2.

The input signal TI to the non-signal detection timer 7 is constituted of two different intervals, i.e., a signal interval in which there are reversals of polarity and a non-signal interval in which there is no reversal of polarity. In the signal interval, making use of the reversals of polarity, an exclusive OR gate 7b generates a reset pulse continuously supplied to the reset terminal R of the counter 7c, so that the counter 7c remains inactive and non-signal detection signal TO is not output from its output terminal $Q_n$. In the non-signal interval, since the rest pulse is not generated, the counter 7c starts counting the clock pulse CK, and after a prescribed period TM the counter 7c outputs the non-signal detection signal TO from its output terminal Qn.

Referring to FIG. 2, the non-signal detection signal TO output from the output terminal Qn of the counter 7c is input to the latch circuit 6. The latch circuit 6 is a D flip-flop and the non-signal detection signal TO is input to the clock terminal CK of the D flip-flop 6. The D terminal of the D flip-flop 6 is held at the supply voltage. When the request-to-send signal RTS is active (H-level) and the non-signal detection signal TO is input to the clock terminal CK, a latch signal (switch signal LO) is output from the Q terminal. The switch signal LO is input to the S terminal of the data selector 3, and thereby, the transmission signal ORS, instead of the relay signal RLS, is output from the data selector 3. In order to finish the sending of the transmission signal, the request-to-send signal RTS is turned off as described above, whereby the D flip-flop 6 is reset, the switch signal LO is turned off, and the data selector 3 is switched so as to output the relay signal RLS. However, when the switch signal LO is turned from an on-state to an off-state, a trigger pulse is generated by a delay circuit 8a, an inverter 8b, and an AND gate 8c in the signal sending stopping timer 8. This trigger pulse is input to a monostable multivibrator 8d and thereby a one-shot signal TFO is output therefrom throughout a prescribed time TF determined by the time constant of the monostable multivibrator 8d. The signal TFO is input to the G terminal of the data selector 3, and thereby, the output Y is fixed to a predetermined logical level so that a signal having no reversal of polarity (representing the non-signal state) is output from the data selector 3 throughout the prescribed time TF.

Figure 4:
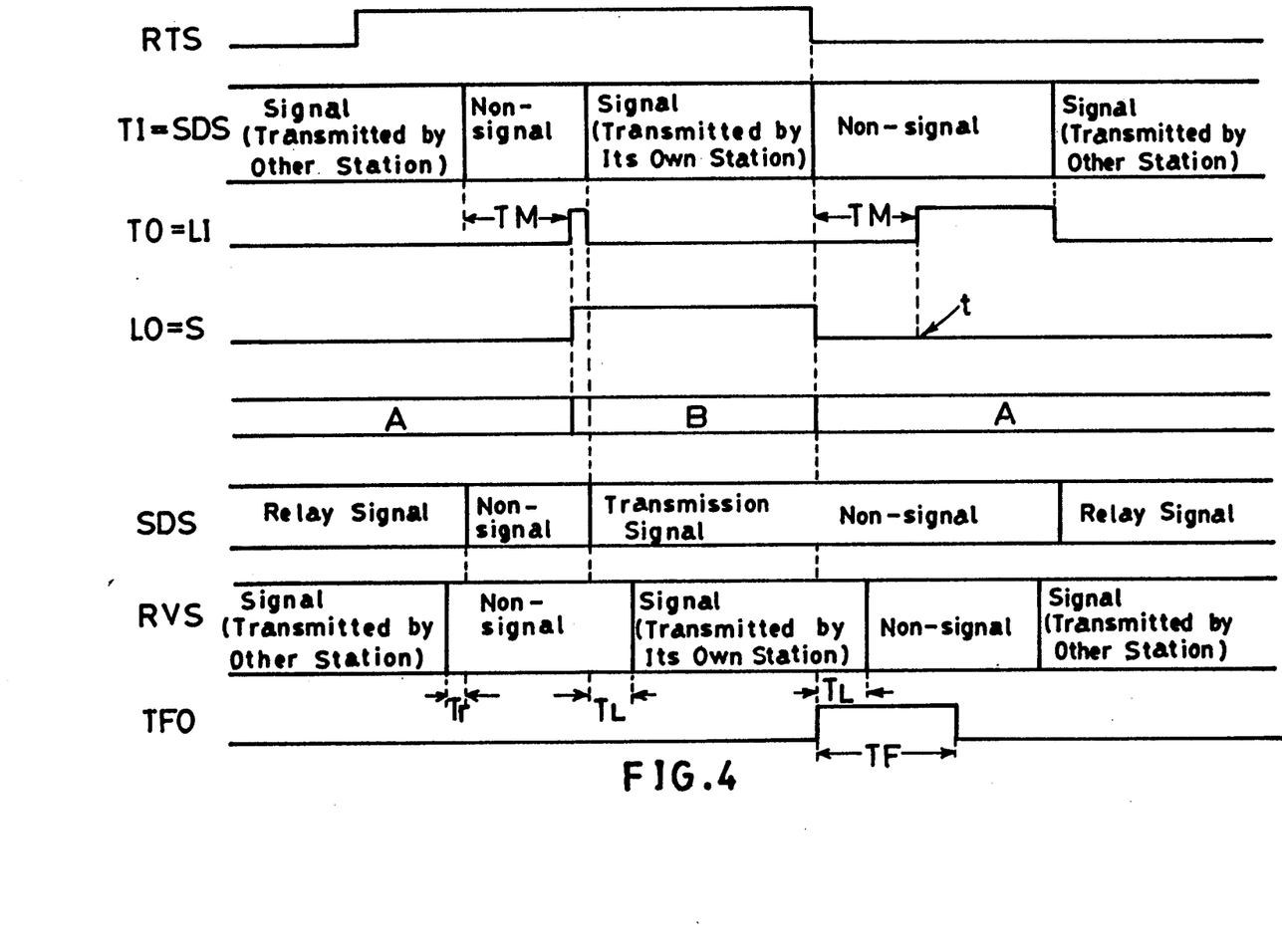
FIG. 4 is a timing chart in a master station M where the send signal is adapted to be input to a non-signal detection timer shown in FIG. 1 and FIG. 2.

FIG. 4 is a timing chart of a master station M wherein a send signal SDS is supplied with its non-signal detection timer 7 shown in FIG. 1 and FIG. 2.

A request-to-send signal RTS as shown in FIG. 4 is output from the transmission source computer 21. The ON-state (H level) of the request-to-send signal RTS indicates that the computer 21 requests to send data. When there is the request to send data, the input signal TI to the non-signal detection timer 7, i.e., the send signal SDS, has changed from the transmission signal transmitted from another master station to a non-signal state indicating that the master station abandoned its transmission right. Then, a non-signal detection signal TO is output from the non-signal detection timer 7 when a prescribed time TM has elapsed after when the signal changed to the non-signal state and this signal is input to the LI terminal of the latch circuit 6. Thereby, a switch signal LO generated from the non-signal detection signal TO latched by the latch circuit 6 is output therefrom, and this switch signal LO is input to the S terminal of the data selector 3. Thereby, switching takes place in the data selector 3 so that a transmission signal ORS input to the input terminal B may be output, instead of a relay signal RLS which has so far been input to the input terminal A. The switch signal LO is also input as a transmission enable signal to the transmitter 5 and the transmission source computer 21, and thereby, the transmitter 5 and the transmission source computer 21 are informed of the timing of data transmission. Thus, the transmission signal ORS generated by master station M is transmitted from this master station, starting at the head of the first frame after the switching of the data selector 3. In order to finish the transmission signal ORS sent out of this master station M, the transmission source computer 21 turns off the request-to-send signal RTS. Thereby, the send signal SDS is brought into a non-signal state for the prescribed time TF as described above, and thereafter, the signal is switched to the relay signal RLS.

Comparing the send signal SDS with the received signal RVS takes the lead, i.e., the received signal RVS is sent as the send signal SDS from this master station M delayed by a relaying delay time Tr in this master station M. When a transmission signal is sent from this master station, it is received by this master station M after a delay of one circuiting time TL which the signal takes in circulating through the transmission line in the loop form (refer to FIG. 10). The output of the signal sending stopping timer 8 (the output of the monostable multivibrator 8d shown in FIG. 2) is a one shot signal with a pulse width of a prescribed time TF as shown in FIG. 4. Although a non-signal detection signal TO is output at the point of time t by the non-signal state transmitted by this particular master station M, the switch signal LO is not output from the latch circuit 6 because the request-to-send signal RTS is off at this point of time.

Figure 5:
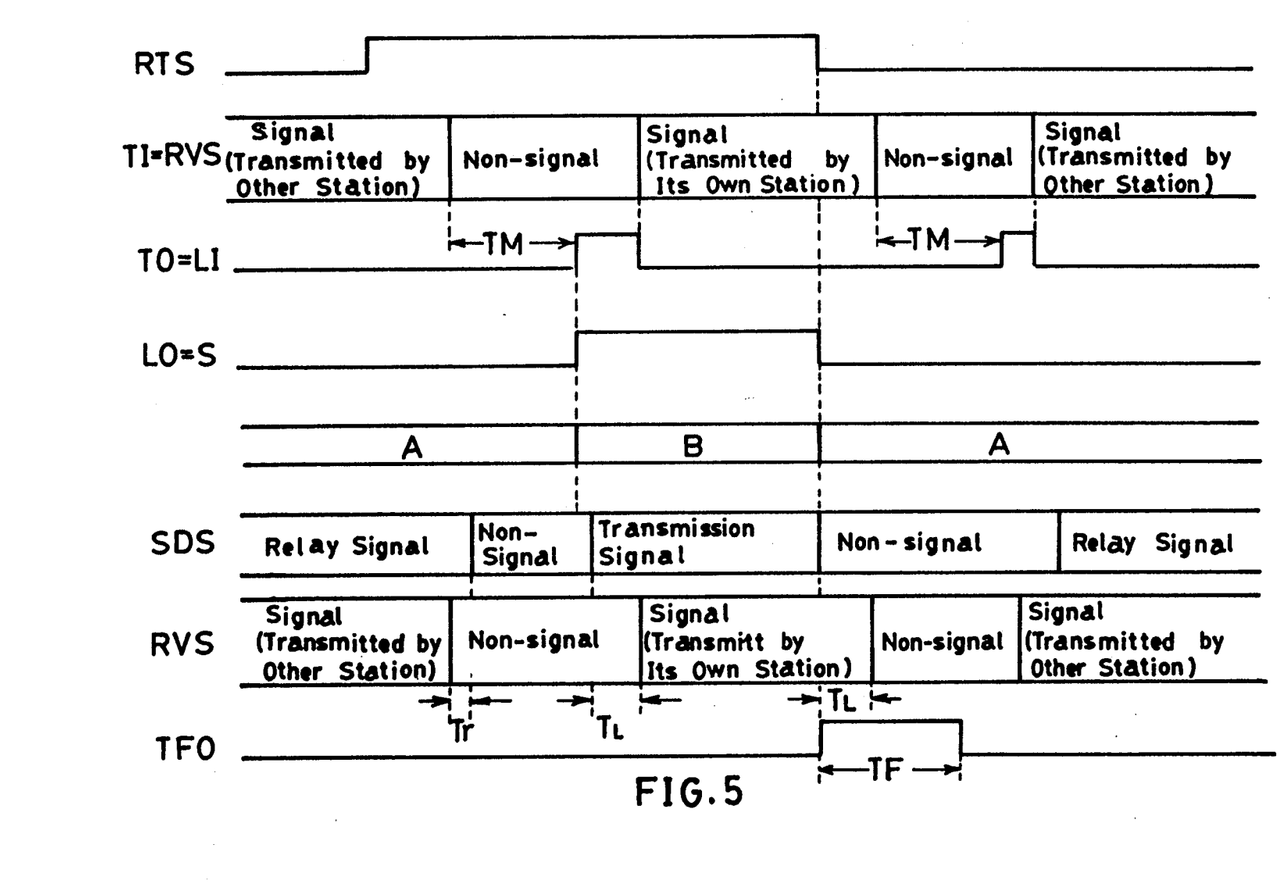
FIG. 5 is a timing chart in a master station M where the received signal is adapted to be input to a non-signal detection timer.

FIG. 5 is a timing chart in the master station M on condition that a received signal RVS is supplied with the non-signal detection timer 7. As the structure of the timing chart shown in FIG. 5 is virtually the same as FIG. 4, the description of the same will be omitted.

Figure 6:
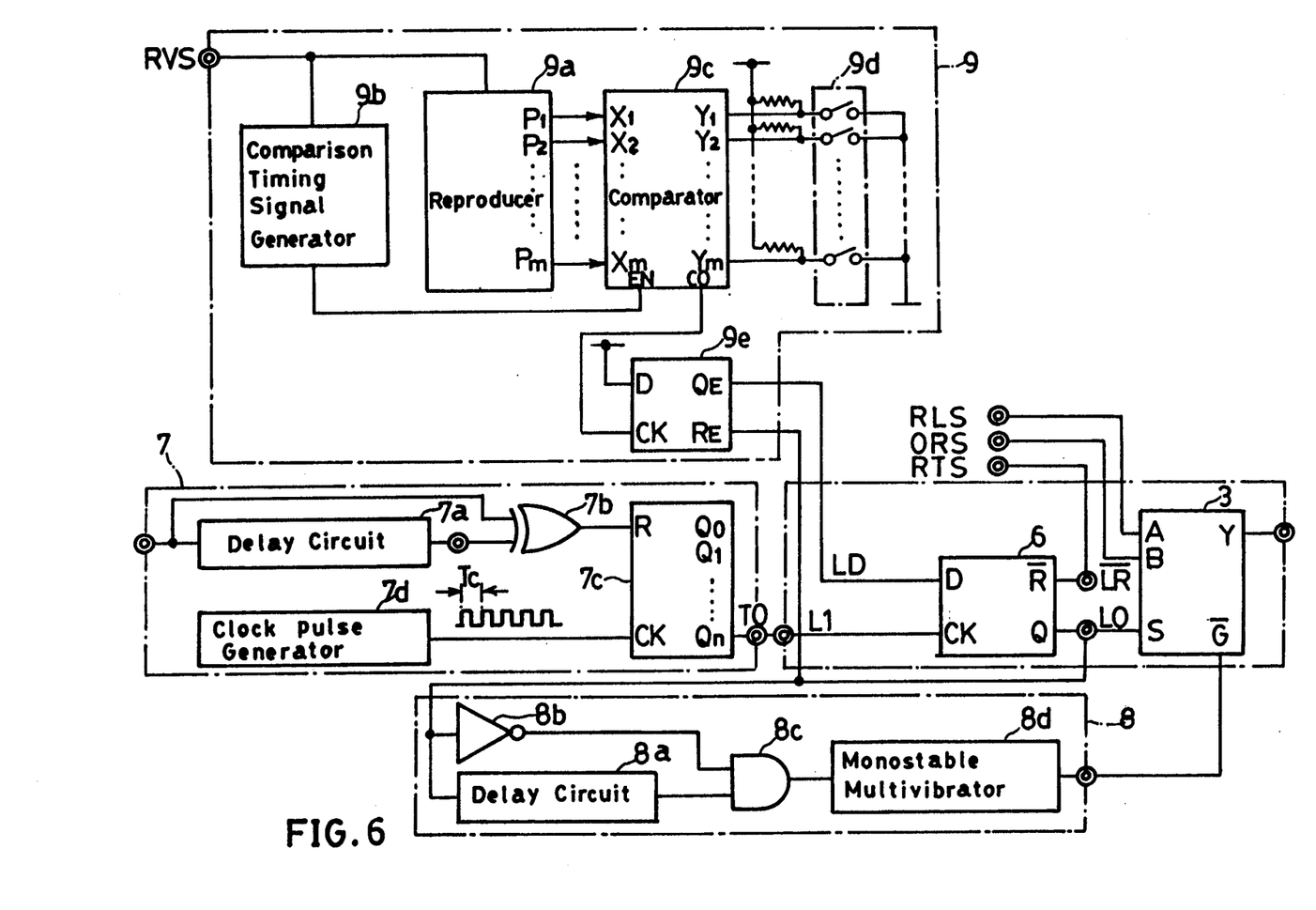
FIG. 6 is a circuit diagram showing a transmission enable signal generator as indicated by a broken line in FIG. 1, and a sending controller connected to the transmission enable signal generator.

FIG. 6 is a circuit diagram showing the transmission enable signal generator 9 indicated by a broken line in FIG. 1 and the sending controller (the combination of the data selector 3, latch circuit 6, non-signal detection timer 7, and signal sending stopping timer 8) connected with the transmission enable signal generator 9.

In the received signal RVS, there is recorded the address of the next owner designated by the present owner. The received signal RVS is input to a reproducer 9a and a comparison timing signal generator 9b of the transmission enable signal generator 9. The reproducer 9a is comprised of a combination of a demodulator for demodulating the input received signal RVS and a shift register for converting the demodulated signal into a parallel signal. From output terminals $P_1, P_2, \ldots, P_m$ of the reproducer 9a, the address of the next owner is output. The output signals $P_1, P_2, \ldots, P_m$ are input to in put terminals $X_1, X_2, \ldots, X_m$ of a comparator 9c. Meanwhile, the address of this master station M is set by a switch group 9d connected with input terminals $Y_1, Y_2, \ldots, Y_m$. The comparison timing signal generator 9b is a circuit providing a pulse to the output terminals $P_1, P_2, \ldots, P_m$ at the input of the final bit of the address of the next owner and this pulse is input to the EN terminal of the comparator 9c. Then, the signals $X_1, X_2, \ldots, X_m$ are compared with the signals $Y_1, Y_2, \ldots, Y_m$, and when $X_i = Y_i$ for all values of $i = 1, 2, \ldots, m$, a concurrence signal is output from the CO terminal. The concurrence signal CO is input to a D flip-flop 9e to be latched thereby and the latched signal LD is input to the D terminal of the D flip-flop 6 (latch circuit 6). This signal LD is the sending enable signal. Since other circuit components in FIG. 6 are the same as the circuit components shown in FIG. 2, they are denoted by corresponding reference numerals to those used in FIG. 2, and description thereof is omitted.

Below will be discussed the proper values of the prescribed time TM given by the non-signal detection timer 7 and the prescribed time TF given by the signal sending stopping timer 8, referring to FIG. 7 and FIG. 8

Figure 7:
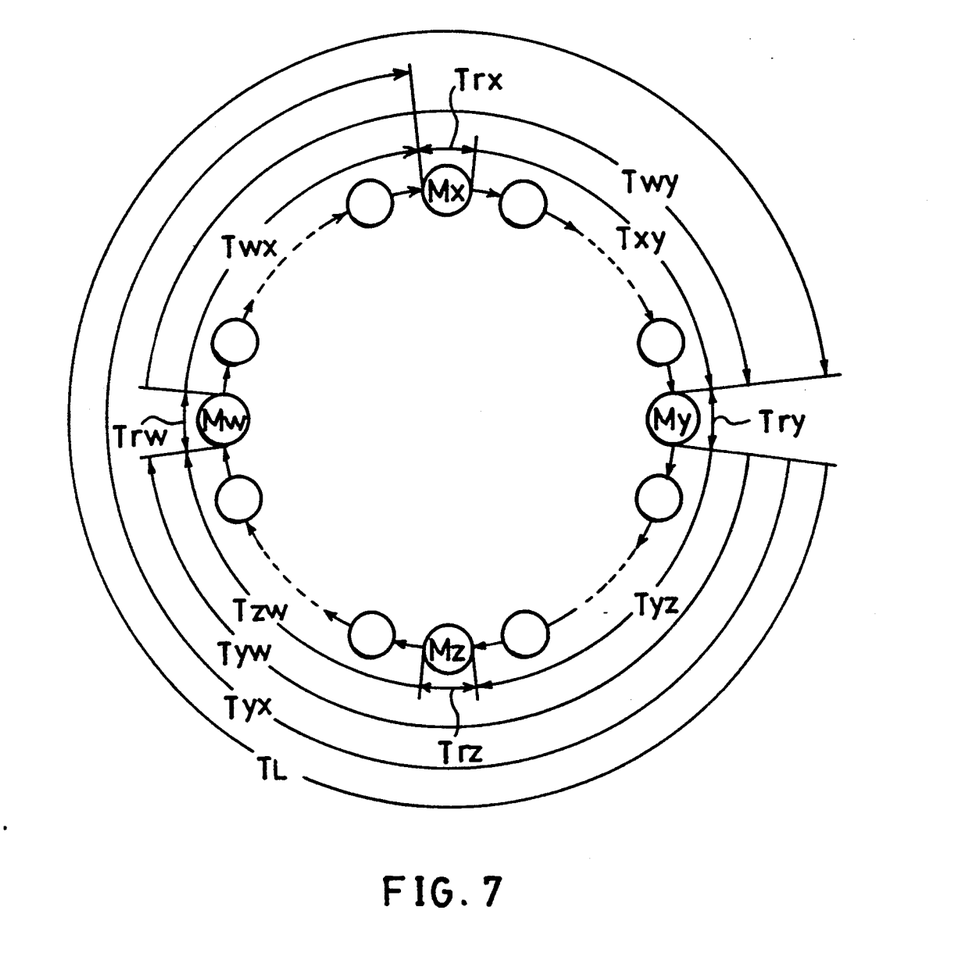
FIG. 7 is a schematic diagram showing typical values of propagation delay time of a signal in the data communication apparatus shown in FIG. 10.

FIG. 7 is a schematic diagram showing typical values of propagation delay time of a signal in FIG. 10.

Figure 8:
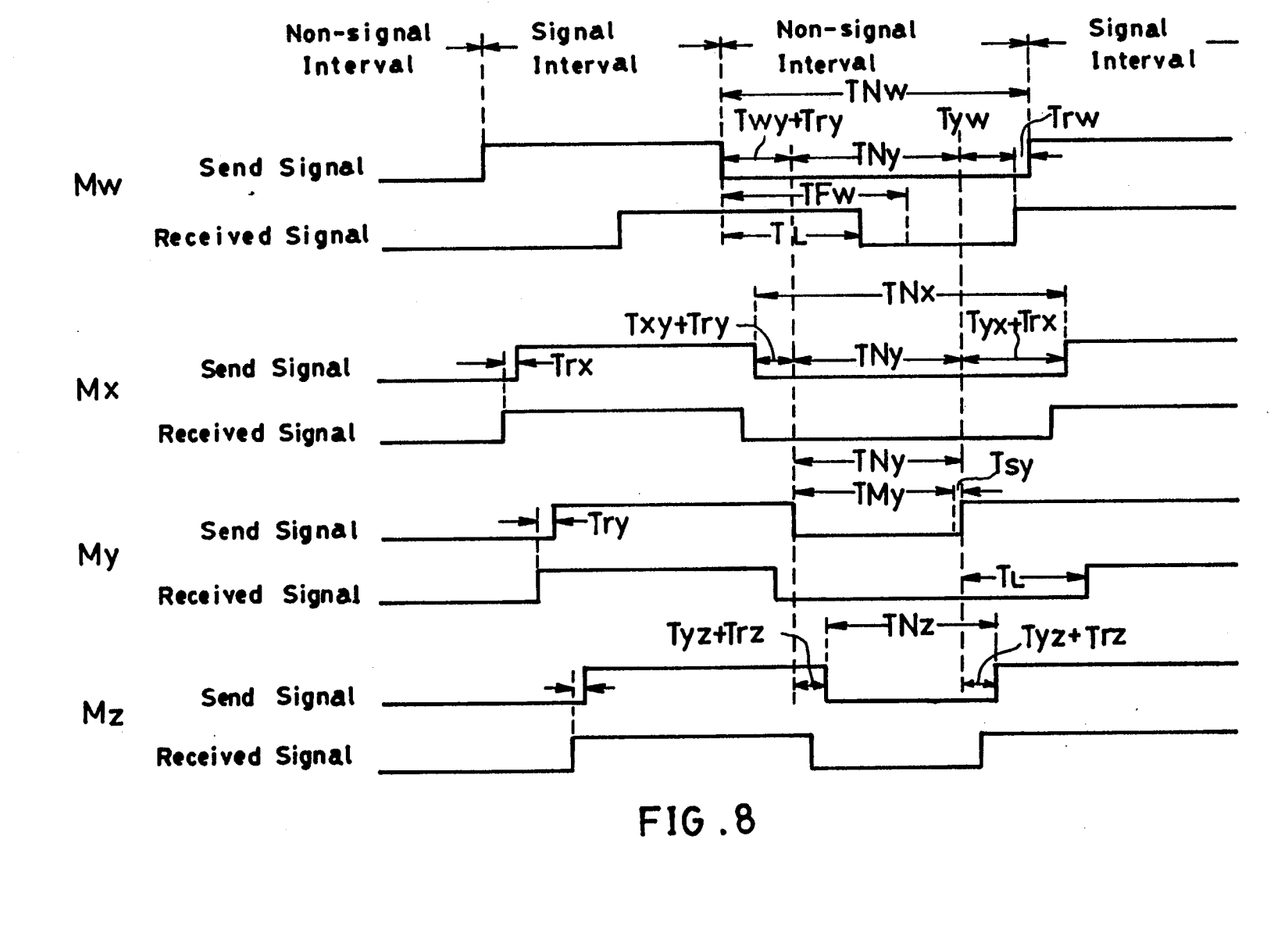
FIG. 8 is a timing chart showing the send signal and received signal in each master station where the send signal is the input of the non-signal detection timer.

FIG. 8 is a timing chart showing the send signals and the received signals of the master stations ($M_w$, $M_x$, $M_y$, $M_z$), in the case where the send signal is input to the non-signal detection timer. In the present case, the signal interval is indicated by the H level and the non-signal interval by the L level. The reference characters used in the following explanation are as follows:

$M_w$ is a master station having a transmission right at first, and then abandoning (the 1st owner);

$M_y$ is a master station next obtaining the transmission right from $M_w$ (the next owner);

$M_x$ is an arbitrary master station in front of $M_y$;

$M_z$ is an arbitrary master station behind $M_y$;

$T_{rw}$ is the relaying delay time of $M_w$;

$T_{rx}$ is the relaying delay time of $M_x$;

$T_{ry}$ is the relaying delay time of $M_y$;

$T_{rz}$ is the relaying delay time of $M_z'$ $T_{wx}$ is the propagation delay time from $M_w$ to $M_x$;

$T_{xy}$ is the propagation delay time from $M_x$ to $M_y$;

$T_{yz}$ is the propagation delay time from $M_y$ to $M_z$;

$T_{zw}$ is the propagation delay time from $M_z$ to $M_w$;

$T_{wy}$ is the propagation delay time from $M_w$ to $M_y$;

$T_{yw}$ is the propagation delay time from $M_y$ to $M_w$;

$T_{yx}$ is the propagation delay time from $M_y$ to $M_x$;

TL is the circulated time making a round of the network;

$TM_w$ is the first prescribed time TM of $M_w$;

$TM_x$ is the first prescribed time TM of $M_x$;

$TM_y$ is the first prescribed time TM of $M_y$;

$TM_z$ is the first prescribed time TM of $M_z$;

$TF_w$ is the second prescribed time TF of $M_w$;

$TF_x$ is the second prescribed time TF of $M_x$;

$TF_y$ is the second prescribed time TF of $M_y$;

$TF_z$ is the second prescribed time TF of $M_z$;

$TN_w$ is the non-signal interval of the $M_w$ after $M_w$ stops sending;

$TN_x$ is the non-signal interval of the $M_x$ after $M_w$ stops sending;

$TN_y$ is the non-signal interval of the $M_y$ after $M_w$ stops sending;

$TN_z$ is the non-signal interval of the $M_z$ after $M_w$ stops sending;

$T_{sy}$ is the transient time of $M_y$ from the time-up of the non-signal detection time (in $M_y$) until $M_y$ starts sending as the next owner;

Since each master station is generally comprised of the same specification hardware in this case, it will be recognized that each master station has the same TL and the same Tr (i.e, $T_r = T_{rw} = T_{rx} = T_{ry} = T_{rz}$).

Initially, we investigate the conditions satisfying TF. (TF is a second prescribed time given by a signal sending stopping timer).

As is evident from FIG. 8, it will be recognized that stopping transmission of the owner station must generate a non-signal state in any position of the loop-network to prevent transmission collision. Therefore it is necessary to realize the following condition $$TL < TF_w < TN_w, \qquad (1)$$

where $$TN_w = TM_y + TL \qquad (2)$$

(referred to equation (5) later).

If TM is the minimum value of the prescribed time TM, the condition to realize the expression (1) as follows:

$$TL < TF_w < TM_{min} + TL \qquad (3)$$

Since any master station can obtain the transmission right, the signal sending stopping timer must be satisfied with $$TL < TF_i < TM_{min} + TL \qquad (4)$$

Where i = 1, 2, ..., n; and
n = the number of master stations.

The following describes the conditions required by TM (TM is a first prescribed time given by the non-signal detection timer).

FIG. 8 shows the relation as follows:

$$\begin{aligned} TN_w &= (T_{wy} + T_{ry}) + TN_y + (T_{yw} + T_{ry}) \\ &= TN_y + T_{ry} + TL \\ &= TM_y + (T_{sy} + T_{ry}) + TL \\ &\approx TM_y + TL; \end{aligned} \qquad (5)$$

$$\begin{aligned} TN_x &= (T_{xy} + T_{ry}) + TN_y + (T_{yx} + T_{rx}) \\ &= TN_y + T_{ry} + TL \\ &= TM_y + (T_{sy} + T_{ry}) + TL \\ &\approx TM_y + TL \end{aligned} \qquad (6)$$

$$\begin{aligned} TN_y &= TM_y + T_{sy} + TL \\ &\approx TM_y + TL \end{aligned} \qquad (7)$$

$$TN_z = (TN_y = TM_y) + T_{sy} \qquad (8)$$

In FIG. 8, the condition to check transmission collision just after $M_y$ starts original-sending as follows:

$$TM_w > TN_w, \qquad (9)$$

$$TM_x > TN_x, \qquad (10)$$

$$TM_z > TN_z, \qquad (11)$$

From expressions (9)–(11), we obtain $$TM_w - TN_y > TL, \qquad (12)$$

$$TM_x - TN_y > TL, \qquad (13)$$

$$TM_z - TN_y > 0. \qquad (14)$$

Therefore, $$TM_i - TM_y \, TL, \qquad (15)$$

where i = 1, 2, ..., n; i≠y.

Since $M_y$ is not a special station but an arbitrary station, the condition to check transmission collision is finally expressed as $$|TM_i - TM_j| > TL \text{ for all values of i, j} \quad (16)$$

where i≠j, i = 1, 2, ..., n, j = 1, 2, ..., n

Further, for generating an non-signal state, $TF_i$ must be greater than the maximum period of polarity reversal TP, and hence, the following expression must also be satisfied:

$$TM_i > TP \text{ for all values of i,} \quad (17)$$

where i = 1, 2, ... n.

Figure 9:
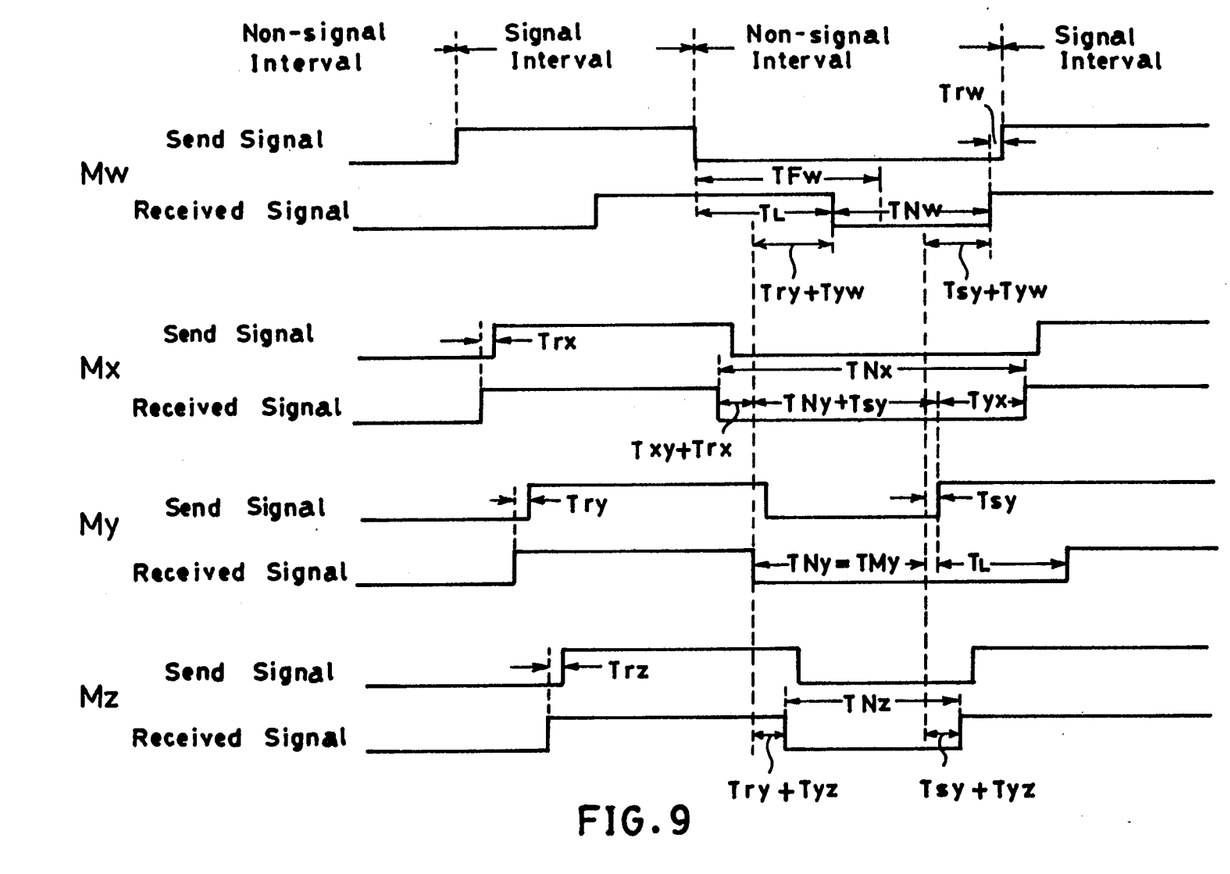
FIG. 9 is a timing chart showing the send signal and received signal in each master station in the case where the received signal is the input of the non-signal detection timer.

FIG. 9 is a timing chart similar to FIG. 8 indicating the send signal and received signal in each of the master stations $M_w$, $M_x$, $M_y$, and $M_z$ in the case where the received signal is input to the non-signal detection timer.

Considering the same as in FIG. 8, $TF_w$ must satisfy $$TL < TF_w < TL + TN_w = TL + TM_y \quad (18)$$

Further, since $$TM_y \geq TM_{min}, \quad (19)$$

the condition $$TL < TF < TM_{min} + TL \quad (20)$$

must be requested by all of the master stations. The expression (20) is the same as the expression (4) in the case where the send signal is input to the non-signal detection timer.

Now, the condition to be needed by TM will be considered. Since $$\begin{aligned}
TN_w &= (TN_y - (T_{ry} + TN_{yw}) + (T_{sy} + T_{yw}) \quad (21)\\
&= TN_y + (T_{sy} - T_{ry})\\
&= TM_y + (T_{sy} - T_{ry})\\
&\approx TM_y,\\
\\
TN_x &= (T_{xy} + T_{rx}) + (TN_y + T_{sy}) + T_{yx} \quad (22)\\
&= TN_y + TL + T_{sy}\\
&= TM_y + TL + T_{sy}\\
&\approx TM_y + TL,\\
\\
TN_z &= TN_y - (T_{ry} + T_{yz}) + (T_{sy} + T_{yz}) \quad (23)\\
&= TN_y + (T_{sy} - T_{ry})\\
&= TM_y + (T_{sy} - T_{ry})\\
&\approx TM_y,
\end{aligned}$$

the conditions to prevent transmission collision $$TM_w > TN_w, \quad (24)$$

$$TM_x > TN_x, \quad (25)$$

$$TM_z > TN_z, \quad (26)$$

are respectively expressed as $$TM_w - TM_y > 0, \quad (27)$$

$$TM_x - TM_y > TL, \quad (28)$$

$$TM_z > TM_y > 0. \quad (29)$$

Accordingly, $$TM_i - TM_y > TL,$$

where i≠y, i = 1, 2, ..., n.

What is claimed is:

1. A data communication unit sending a digital serial signal through a transmission route located in a communication network, said data communication unit including:

a relay unit for generating a relay signal in response to a received signal;

a transmitter for generating a transmission signal comprised of original data; and a sending controller coupled to said relay unit and said transmitter, said sending controller comprising:

(i) a first timer which generates a trigger output TO after a non-signal state is continued for a first prescribed time TM, (ii) a second timer which starts a non-signal state and maintains said non-signal state for a second prescribed time TF after the end of sending said transmission signal, said sending controller further comprising, (iii) a sending control circuit which includes a selector means which selects a send signal among said received signal and said transmission signal by using said trigger output TO and determining whether a request-to-send signal RTS is active or inactive, and a non-signal generator means which maintains a polarity of said send signal as a fixed value for said prescribed time TF when said signal RTS becomes inactive during sending said transmission signal.

2. A data communication unit according to claim 1, wherein said relay unit records information about the polarity of said signal RTS in said received signal.

3. A data communication unit according to claim 1, further comprising a transmission enable signal generator for generating a transmission enable signal TES when address information included in said received signal is coincident with the address of said data communication unit, said sending controller switching said send signal from said relay signal to said transmission signal only when said signal TES is output from said transmission enable signal generator.

4. A data communication unit according to claim 3, wherein said relay unit records information about the polarity of said signal RTS and information of its own address in said received signal.

5. A data communication unit according to claim 1, wherein said send signal has a signal format wherein the polarity reversal of said send signal occurs within a prescribed polarity-reversal period TP and it is configured such that the signal-sending state and the non-signal state is distinguished by whether or not reversal of polarity occurs within said period TP.

6. A data communication apparatus comprising a plurality of data communication units according to claim 5, located in a communication loop-network.

7. A data communication apparatus according to claim 6, comprising n (where n is an integer larger than 1) of said data communication units located in said communication loop-network having a second prescribed time $TF_i$ which satisfies the following condition:

$$TL < TF_i < TL + TM_{min} \text{ for all values of } i$$

where $i = 1, 2, \ldots, n$

TL is the circulated time it takes a signal to make a round of the said communication loop-network $TM_{min}$ is the minimum value of said first prescribed time of all n data communication units.

8. A data communication apparatus according to claim 6, comprising n (where n is an integer larger than 1) of said data communication units located in said communication loop-network, any of said data communication units having a first prescribed time defined by $TM_i$ or $TM_j$ which satisfies the relations $$|TM_i - TM_j| > TL \text{ for all values of } i, j$$

and $$TM_i > TP \text{ for all values of } i$$

where $i \neq j$, $i = 1, 2, \ldots, n$, $j = 1, 2, \ldots, n$

TL is the circulated time it takes a signal to make a round of said communication loop-network and TP is said prescribed polarity-reversal period TP.

* * * * *